US007954305B2

(12) United States Patent
Dey

(10) Patent No.: US 7,954,305 B2
(45) Date of Patent: Jun. 7, 2011

(54) CONTAINER AND METHOD FOR MAKING CONTAINER FOR OXYGEN-SENSITIVE PRODUCTS

(75) Inventor: Subir K. Dey, Florence, SC (US)

(73) Assignee: Sonoco Development, Inc., Hartsville, SC (US)

( * ) Notice: Subject to any disclaimer, the term of this patent is extended or adjusted under 35 U.S.C. 154(b) by 0 days.

(21) Appl. No.: 12/911,159

(22) Filed: Oct. 25, 2010

(65) Prior Publication Data

US 2011/0036059 A1 Feb. 17, 2011

Related U.S. Application Data

(62) Division of application No. 11/199,785, filed on Aug. 9, 2005, now Pat. No. 7,854,973.

(51) Int. Cl.
*A23B 7/00* (2006.01)
*B29D 22/00* (2006.01)
*B32B 7/00* (2006.01)
*B65D 85/00* (2006.01)

(52) U.S. Cl. ............... 53/432; 53/428; 53/440; 53/510; 426/106; 428/21; 428/34.1; 428/215; 525/371

(58) Field of Classification Search ............... 53/432, 53/428, 440, 510; 426/106; 428/21, 34.1, 428/215; 525/371
See application file for complete search history.

(56) References Cited

U.S. PATENT DOCUMENTS

| 5,143,763 | A | 9/1992 | Yamada et al. |
| 5,239,016 | A | 8/1993 | Cochran et al. |
| 5,350,622 | A | 9/1994 | Speer et al. |
| 5,529,833 | A | 6/1996 | Speer et al. |
| 5,759,653 | A | 6/1998 | Collette et al. |
| 6,037,022 | A | 3/2000 | Adur et al. |
| 6,071,626 | A | 6/2000 | Frisk |
| 6,499,311 | B2 | 12/2002 | Mahajan |
| 6,562,258 | B1 | 5/2003 | Elsome et al. |
| 6,682,791 | B2 | 1/2004 | McKnight |
| 2002/0020151 | A1 | 2/2002 | DelDuca et al. |
| 2004/0000127 | A1 | 1/2004 | Joshi et al. |
| 2004/0047952 | A1 | 3/2004 | Merriman et al. |
| 2005/0106380 | A1 | 5/2005 | Gray et al. |

FOREIGN PATENT DOCUMENTS

GB 1188170 4/1970

OTHER PUBLICATIONS

T.P. Labuza and W.M. Breene; *Applications of "Active Packaging" for Improvement of Shelf-Life and Nutritional Quality of Fresh and Extended Shelf-Life Foods*; Journal of Food Processing & Preservation; 1989; pp. 1-69. James A. Solis and Brad D. Rodgers; *Factors Affecting the Performance of New Oxygen-Scavenging Polymer for Packaging Applications*; Chevron Phillips Chemical Company LP; presented at "Polyolefins 2001", Feb. 2001.
Brad D. Rodgers and Lou Compton; *New Polymeric Oxygen Scavenging System for Coextruded Packaging Structures*; Chevron Chemical Company; presented at "Oxygen Absorbers 2001 and Beyond", Jun. 2000.

*Primary Examiner* — Brent T O'Hern
(74) *Attorney, Agent, or Firm* — Alston & Bird LLP

(57) ABSTRACT

A packaging system or container for packaging one or more oxygen-sensitive products. The container includes a wall that defines an interior for receiving one or more oxygen-sensitive products. The space between the product or products and the wall defines a headspace. The headspace is filled with an inert gas and a scavenger gas. The wall has at least an inner layer and one or more outer layers. At least one of the outer layers includes an oxidation catalyst such that as oxygen diffuses from outside the container to the interior and scavenger gas diffuses from the interior to outside the container, the diffusing scavenger gas and oxygen react together with the oxidation catalyst in one or more of the outer layers substantially consuming the oxygen.

7 Claims, 1 Drawing Sheet

CONTAINER AND METHOD FOR MAKING CONTAINER FOR OXYGEN-SENSITIVE PRODUCTS

CROSS REFERENCE TO RELATED APPLICATIONS

Figure 1:
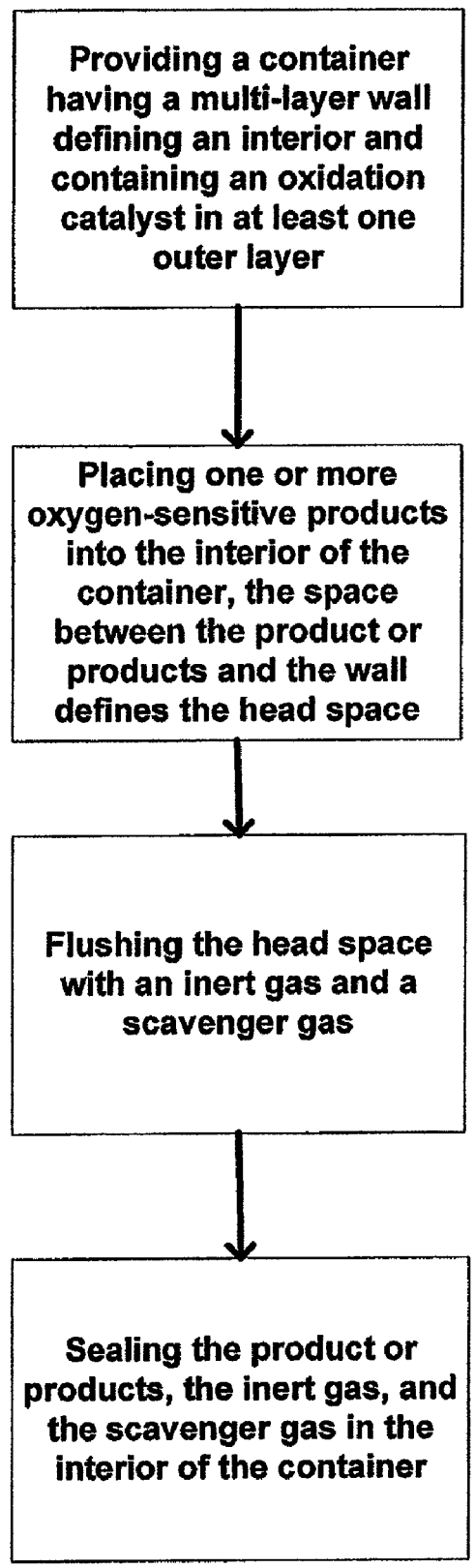

This application is a divisional application of U.S. patent application Ser. No. 11/199,785, filed Aug. 9, 2005, now U.S. Pat. No. 7,854,973, the entire disclosure of which is hereby incorporated herein by reference.

BACKGROUND OF THE INVENTION

1) Field of the Invention

The present invention generally relates to active oxygen scavengers for packaging.

2) Description of Related Art

It is well known that limiting exposure of oxygen-sensitive products to oxygen maintains and enhances the quality and "shelf-life" of the product. By limiting the oxygen exposure of oxygen-sensitive products in a container or package, the quality of the products is maintained and spoilage or damage due to oxidation is avoided. In addition, such packaging also keeps the product fresh in inventory longer, thereby reducing costs incurred in disposing of expired products and restocking with fresh products.

Some containers function as a passive barrier to oxygen, i.e. physically isolating the food in the container from the oxygen in the air outside the container. The effectiveness of relying on the container as a passive barrier is limited. Most containers are not air tight; oxygen can diffuse through the container walls over time. Additionally, for oxygen-sensitive solid foods like nuts, the voids and empty space within the container between the nuts and between the nuts and the container wall may contain a significant amount of oxygen that was trapped during packaging.

In order to increase the oxygen barrier effectiveness of the containers, an increasing number of containers are using active barriers to protect oxygen-sensitive products. Active barriers, also referred to as active packaging, entail the use of oxygen scavengers, which are materials that can chemically bind with oxygen in order to capture the oxygen before it can cause damage to the oxygen-sensitive products.

Some packages employing oxygen scavengers rely on an iron-based catalyst. For example, some packages include one or more sachets, which contain an iron-based composition, placed in the interior of the package. The iron-based composition scavenges the oxygen through an oxidation process. However, formation of the sachets requires an additional packaging operation. Also, many consumers are uncomfortable at finding something that appears foreign near their food. Another risk or danger is accidental consumption of a sachet when placing one in a food container. Alternatively, the iron-based compositions are sometimes embedded into the walls of the containers, but this degrades the wall's transparency and mechanical properties. Another drawback to iron-based catalyst is the need for specific atmospheric conditions, specifically high enough humidity, in the package in order for the scavenging to occur at an effective rate.

Other packages contain oxygen scavengers within the wall structures of the package. Typically, the walls are made from a composition of resin, an oxygen scavenger, and a catalyst. Possible scavengers are unsaturated hydrocarbon or ascorbic acid. Often the catalyst is a transition metal catalyst in the form of a metallic salt. Oxidation or the scavenging of oxygen usually begins with such structures as soon as the container or package is formed. However, manufacturers of the containers often must store the containers for a time before the packager will actually use the containers for packaging products. Therefore many of these containers lose their effectiveness before being used. Some oxidizable polymers have been developed which allow for controlled activation with the use of a UV station. However, these types of containers may be prone to premature activation if not shielded properly before packaging.

It would be advantageous, therefore, to have a container or package with an active oxygen scavenger which does not require specific environmental conditions, such as relatively high humidity, and is activated near or at the point where the products are placed within the container or package. Also, it would be advantageous for the presence of the active oxygen scavenger to be essentially undetectable by consumers.

BRIEF SUMMARY OF THE INVENTION

The present invention addresses the above needs and achieves other advantages by providing a packaging system or container for packaging one or more oxygen-sensitive products. In general, the present invention includes a container having a wall. The wall defines an interior for receiving one or more oxygen-sensitive products. The space between the product or products and the wall defines a headspace. The headspace is filled with an inert gas and a scavenger gas. The wall has at least an inner layer and one or more outer layers. At least one of the outer layers includes an oxidation catalyst such that as oxygen diffuses from outside the container to the interior and scavenger gas diffuses from the interior to outside the container, the diffusing scavenger gas and oxygen react together with the oxidation catalyst in one or more of the outer layers, substantially consuming the oxygen.

In one embodiment, the container's wall has an inner layer, a first outer layer and a second outer layer. The first outer layer or intermediate layer is between the inner layer and the second outer layer. This intermediate layer may be an adhesive for affixing the inner layer and the second outer layer together. At least one of the layers of the wall may be an ethylene-vinyl alcohol copolymer, polyamide homo or copolymer, polyacrylonitrile copolymer, PVC, PVDC, PEN or other polymer with low oxygen permeability.

Preferably, the oxidation catalyst is a transition metal catalyst selected from the group consisting of iron, nickel, copper, manganese and cobalt. Furthermore, the transition metal may be in the form of a transition metal salt or organometal.

The scavenger gas comprises an unsaturated hydrocarbon gas and may also include a portion of hydrogen gas. The inert gas may be, for example, nitrogen, argon, or carbon dioxide.

In another aspect, the present invention provides a method of packaging oxygen-sensitive products. The method includes providing a container having a multi-layer wall defining an interior and containing an oxidation catalyst in at least one outer layer of the wall, placing one or more oxygen-sensitive products into the interior of the container, flushing the interior with an inert gas and a scavenger gas, and then sealing the product or products, inert gas, and scavenger gas in the interior of the container.

The present invention has several advantages. Flushing the headspace with the inert gas and scavenger gas replaces or removes oxygen within the container before sealing the container. The flushing, by providing the scavenger gas, activates the oxidation process. Advantageously the flushing occurs near or at the point where the products are placed in the container, which is a desirable time to activate the oxidation process. Also, the container provides active oxygen protection which is essentially unnoticeable to the consumers.

BRIEF DESCRIPTION OF THE SEVERAL VIEWS OF THE DRAWING(S)

Having thus described the invention in general terms, reference will now be made to the accompanying drawing, which is not necessarily drawn to scale, and wherein:

FIG. 1 is a flow chart illustrating steps according to one embodiment of the present invention.

DETAILED DESCRIPTION OF THE INVENTION

The present invention now will be described more fully hereinafter with reference to the accompanying drawing, in which some but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

The present invention provides a container or packaging system for oxygen-sensitive products. Examples of oxygen-sensitive products include but are not limited to foods and beverages, pharmaceuticals, oxygen-sensitive medical products, and corrodible metals or products such as electronic devices. Foods and beverages that are especially susceptible to oxygen contamination includes beers, wines, fruit juices, carbonated soft drinks, fruits, nuts, vegetables, meat products, baby foods, coffee, sauces, and dairy products.

In general, the container has a multi-layer wall. The wall defines an interior for receiving the oxygen-sensitive product or products. The space or voids between the products and between the products and the wall define a headspace. The wall has an inner layer and at least one outer layer. Each layer may be made from various materials including polymers and copolymers. For example, one or more of the layers may include ethylene vinyl alcohol (EVOH), polyamide (PA), polyvinylidene chloride (PVDC), polyacrylonitrile (PAN), or polyethylene naphthalate (PEN), copolymers and blends. The preceding materials are advantageous for forming oxygen barriers due to their relatively low oxygen permeability qualities. Polymers or copolymers are the preferred material layer in most application for a variety reasons including cost and mechanical properties such as rigidity and transparency. However, a metallic material such as a foil may also be used as a barrier layer. Due to a metallic layer's extremely low oxygen permeability, it may be preferred in applications requiring an ultra high oxygen barrier.

One or more of the layers may function as an adhesive for binding layers together. In addition, the most outer layer may function as a print layer for displaying information. With the polymers, the wall may be produced by lamination, coextrusion, extrusion blow molding, thermoforming, injection stretch blow molding or any other commercial process.

In one aspect of the invention, at least one of the outer layers of the wall contains an oxidation catalyst. Oxidation catalysts are well-known in the art, and include transition metal catalysts which can readily interconvert between at least two oxidation states. The transition metal catalyst may also be in the form of a transition metal salt or organometal. Suitable transition metal catalysts comprise transition metals including manganese, iron, cobalt, nickel, copper, rhodium, and ruthenium. The catalysts may have an oxidation state, including zero. The transition metal is preferably iron, nickel or copper, more preferably manganese and most preferably cobalt. Suitable counter ions for the metal include chloride, acetate, stearate, palmitate, 2-ethylhexanoate, neodecanoate or naphthenate. Particularly preferable transition metal salts include cobalt (II) 2-ethylhexanoate and cobalt (II) neodecanoate. The transition metal salt may also be an ionomer, in which case a polymeric counter ion is employed. Such ionomers are also well known in the art. The oxidation catalyst may be added to the outer layer or layers by mixing or blending the catalyst with the polymer resin or adhesive during the formation of the wall.

In one embodiment, the wall has an inner layer, a first outer layer, and a second outer layer. The first outer layer is between the inner layer and the second outer layer and comprises an adhesive and the oxidation catalyst. The adhesive attaches the inner layer and second outer layer together. As explained further below, the oxidation catalyst facilitates the consumption of oxygen diffusing through the wall. The second outer layer is an ethylene vinyl alcohol copolymer and provides a passive or physical barrier between the oxygen outside the container and the scavenger gas inside the headspace. In other embodiments, the wall has a third outer layer for displaying information.

In another aspect of the invention, the headspace is flushed with an inert gas and a scavenger gas before sealing the container. For example purposes, the inert gas may be nitrogen, argon, or carbon dioxide. Preferably the scavenger gas is hydrogen gas or hydrocarbon containing single unsaturation or multiple unsaturations. According to some embodiments, the scavenger gas may also include a small amount of hydrogen gas. Again, for example purposes only, the hydrocarbon scavenger gas may be ethylene or acetylene. The ratio of inert gas to scavenger gas may vary by embodiment. Although in theory a higher amount of scavenger gas would protect the products longer, it is preferable to maintain the amount of scavenger gas below the scavenger gas's lower explosion limit for safety purposes. (The lower explosion limit of ethylene is approximately 2.7% in air by volume. The lower explosion limit of acetylene is approximately 2.2% in air by volume. In theory, these lower explosion limits in the present invention could be higher because the ethylene or acetylene is in the presence of an inert gas rather than air.)

Flushing the headspace with an inert gas and a scavenger gas is advantageous. First, the inert gas and scavenger gas replace or remove any oxygen that would otherwise be trapped in the headspace when the container is sealed. Second, as oxygen diffuses from outside the container to the interior of the container over time, the scavenger gas will diffuse from the interior of the container to the outside of the container. In the presence of the oxidation catalyst within the wall, the scavenger gas and oxygen react, consuming the oxygen and protecting the products in the container.

In yet another aspect, the present invention provides a method of packaging oxygen-sensitive products, as illustrated in FIG. 1. The method includes providing a container having a multi-layer wall defining an interior. The multi-layer wall includes one inner layer and at least one outer layer. Furthermore, at least one of the outer layers includes an oxidation catalyst. One or more oxygen-sensitive products are placed into the interior of the container. The space or voids between the products and the space between the products and the wall defines a headspace. The headspace is flushed with an inert gas and a scavenger gas. Next, the product or products, inert gas, and scavenger gas are sealed within the interior of the container.

One in the art would appreciate the numerous manners in which to seal a container. For example purposes only, the container may include an open end configured to sealably engage a lid or membrane closure, metal or plastic alike. Alternatively, in some embodiments, the open end may be closed by bringing the wall together at the open end and forming a heat seal or bond between portions of the wall.

The present invention has several advantages. As stated, flushing the headspace with the inert gas and scavenger gas replaces or removes oxygen within the container before sealing the container. The flushing, by providing the scavenger gas, activates the oxidation process. Advantageously the flushing occurs near or at the time when the products are placed in the container, which is a desirable time to activate the oxidation process. Also, the container provides active oxygen protection which is essentially unnoticeable to the consumers.

Many modifications and other embodiments of the invention set forth herein will come to mind to one skilled in the art to which this invention pertains having the benefit of the teachings presented in the foregoing descriptions and the associated drawing. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of packaging oxygen-sensitive products, the method comprising:
    providing a container having a wall that includes an inner layer and at least a first outer layer, wherein the first outer layer includes an oxidation catalyst;
    placing the at least one oxygen-sensitive product into an interior defined by the wall;
    flushing the interior with an inert gas and a scavenger gas; and
    sealing the product, inert gas, and scavenger gas in the interior of the container.

2. The method according to claim 1, wherein the oxidation catalyst comprises a transition metal catalyst selected from the group consisting of iron, nickel, copper, manganese and cobalt.

3. The method according to claim 2, wherein the transition metal catalyst comprises a metal salt or an organometal.

4. The method according to claim 1 wherein the scavenger gas comprises an unsaturated hydrocarbon gas.

5. The method according to claim 4 wherein the scavenger gas also includes a hydrogen gas.

6. The method according to claim 1 wherein the inert gas comprises nitrogen or carbon dioxide.

7. The method according to claim 1 wherein either the inner layer or the first outer layer of the wall comprises an ethylene-vinyl alcohol copolymer.

* * * * *